(12) United States Patent
Lee et al.

(10) Patent No.: US 6,518,348 B1
(45) Date of Patent: Feb. 11, 2003

(54) CARPET BACKING COMPOUNDS THICKENED BY HYDROPHOBICALLY-MODIFIED ETHYLENE-OXIDE-BASED URETHANE BLOCK COPOLYMERS

(75) Inventors: Si-Ho Lee, Lake Jackson, TX (US); Randall C. Jenkines, Dalton, GA (US); Rhonda R. Suarez, Dalton, GA (US); Rick L. Tabor, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/460,703

(22) Filed: Dec. 14, 1999

(51) Int. Cl.[7] .............................. C08J 9/00; B32B 3/26
(52) U.S. Cl. ...................... 524/491; 524/555; 524/828; 428/304.4; 428/308.4
(58) Field of Search ................. 524/491, 555, 524/828, 914; 428/304.4, 308.4

(56) References Cited

U.S. PATENT DOCUMENTS

| | | | |
|---|---|---|---|
| 3,437,624 A | 4/1969 | Dawn et al. ................ 260/29.2 |
| 3,644,262 A | 2/1972 | Stehle et al. ............ 260/29.6 R |
| 3,890,261 A | 6/1975 | Fitzgerald .............. 260/23.7 H |
| 4,079,028 A | 3/1978 | Emmons et al. ..... 260/29.6 NR |
| 4,092,286 A | 5/1978 | Noll et al. ............ 260/29.2 TN |
| 4,155,892 A | 5/1979 | Emmons et al. ..... 260/29.2 TN |
| 4,164,489 A | 8/1979 | Daniels et al. ........ 260/29.6 R |
| 4,228,058 A | 10/1980 | Hulyalkar et al. ... 260/29.7 UA |
| 4,237,264 A | 12/1980 | Noll et al. ..................... 528/67 |
| 4,296,159 A | 10/1981 | Jenkines et al. .............. 428/95 |
| 4,426,485 A | 1/1984 | Hoy et al. .................. 524/591 |
| 4,496,708 A | 1/1985 | Dehm et al. ................. 528/76 |
| 4,499,233 A | 2/1985 | Tetenbaum et al. ........ 524/591 |
| 4,507,426 A | 3/1985 | Blake, Jr. ................... 524/505 |
| 4,689,256 A | 8/1987 | Slosberg et al. .............. 428/95 |
| 4,714,728 A | 12/1987 | Graham et al. ............. 524/272 |
| 4,742,095 A | 5/1988 | Markusch et al. .......... 523/322 |
| 4,857,565 A | 8/1989 | Henning et al. ............ 523/343 |
| 4,879,322 A | 11/1989 | Markusch et al. .......... 523/322 |
| 5,023,309 A | 6/1991 | Kruse et al. ................... 528/49 |
| 5,037,864 A | 8/1991 | Anand et al. ............... 523/348 |
| 5,221,710 A | 6/1993 | Markusch et al. .......... 524/591 |
| 5,238,534 A * | 8/1993 | Manning et al. ......... 162/164.6 |
| 5,281,654 A | 1/1994 | Eisenhart et al. ........... 524/500 |
| 5,300,551 A | 4/1994 | Candries et al. ............ 524/458 |
| 5,380,785 A | 1/1995 | Ngoc et al. ................. 524/504 |
| 5,412,142 A | 5/1995 | Wilkerson, III et al. ...... 560/33 |
| 5,539,021 A | 7/1996 | Pate et al. ................... 523/335 |
| 5,591,806 A | 1/1997 | Recchia et al. ............. 525/369 |
| 5,661,205 A | 8/1997 | Satoh et al. ................. 524/376 |
| 5,741,393 A | 4/1998 | Hargis et al. ............. 156/307.5 |
| 5,770,660 A | 6/1998 | Lightsey ....................... 526/66 |
| 6,271,276 B1 * | 8/2001 | Gribble et al. ............ 428/314.4 |

FOREIGN PATENT DOCUMENTS

| | | | |
|---|---|---|---|
| EP | 0 905 157 A1 | 3/1999 | |
| WO | 98/41552 | 9/1998 | ........... C08G/18/08 |
| WO | 98/41681 A1 | 9/1998 | |

OTHER PUBLICATIONS

P. L. Fitzgerald, "Integral Latex Foam Carpet Cushioning", J. Coat. Fab. 1977, vol. 7, pp. 107–120.

R. P. Brentin, "Latex Coating Systems for Carpet Backing", J. Coat. Fab. 1982, vol. 12, pp. 82–91.

* cited by examiner

Primary Examiner—James J. Seidleck
Assistant Examiner—Olga Asinovsky

(57) ABSTRACT

An aqueous dispersed polymeric composition for preparing a carpet backing is provided. The aqueous dispersed polymeric composition comprises an aqueous dispersed polymeric material and a hydrophobically-modified ethylene-oxide-based urethane block copolymer. In the preferred embodiment, the aqueous dispersed polymeric material is an aqueous polyurethane dispersion composition. Moreover, a method for preparing a carpet backing using the aqueous dispersed polymeric composition is provided.

14 Claims, No Drawings

CARPET BACKING COMPOUNDS THICKENED BY HYDROPHOBICALLY-MODIFIED ETHYLENE-OXIDE-BASED URETHANE BLOCK COPOLYMERS

FIELD OF THE INVENTION

This invention relates to carpet backings. More particularly, it relates to aqueous dispersed polymeric compositions containing a hydrophobically-modified ethylene-oxide-based urethane block copolymer as a thickener and a method for preparing a carpet backing therefrom.

DESCRIPTION OF THE PRIOR ART

Carpet processing depends on the rheological properties of the carpet's various layers. Thickeners are added to affect those Theological properties. Unfortunately, the industry standard thickener is a sodium polyacrylate that adversely affects finished carpet tuftbind and water barrier properties. Accordingly, there is a need for a thickener that imparts excellent carpet processing properties without adversely affecting finished carpet tuftbind and water barrier properties. This need particularly applies to tufted carpets.

Generally, tufted carpets minimally consist of tufted fibers through a primary backing and a precoat. Tufted carpets may also have additional layers such as a laminate layer, a secondary layer, and a foam layer. Moreover, the tufted carpet may have more than one secondary layer.

The precoat is required to anchor the carpet tufts to the primary backing. It may also contain an adhesive to adhere the tufted carpet to additional layers or the subfloor. The precoat can affect the carpet's tuft bind, hand, delaminating properties, wet strength properties, wear resistance, and barrier performance. Alternatively, a laminate layer may be applied without a precoat. However, better anchoring is achieved when a precoat is also applied than when a laminate layer is applied alone.

Precoat, laminate, and foam layers may be prepared from a butadiene-acrylonitrile latex, an ethylene-vinyl acetate latex, a styrene-butadiene-butyl acrylate latex, a polychloroprene latex, a polyethylene copolymer latex, an ethylene-styrene latex, a styrene-butadiene-vinylidene chloride latex, a styrene-alkyl acrylate latex, a vinyl latex, or an acrylic latex. However, they are usually prepared from a polyurethane material or a styrene-butadiene latex.

With regard to polyurethane layers, conventional practice in the carpet manufacturing industry requires that a polyurethane layer be prepared from an isocyanate formulation (A-side formulation) and a polyol formulation (B-side formulation) at the carpet manufacturing site. This is sometimes referred to as "A+B chemistry". Preparing a polyurethane layer by A+B chemistry requires a substantial investment in specialized equipment to achieve the exceptional performance characteristics of this method.

Alternatively, the polyurethane layer may be applied as an aqueous polyurethane (PU) dispersion. Aqueous PU dispersions can be prepared by polymerizing the polyurethane reactants in an organic solvent followed by dispersion of the resulting solution in water, and optionally followed by removal of organic solvent. See U.S. Pat. Nos. 3,437,624; 4,092,286; 4,237,264; 4,742,095; 4,857,565; 4,879,322; 5,037,864; and 5,221,710, which are incorporated herein by reference. Also, an aqueous polyurethane dispersion may be prepared by first forming a prepolymer, next dispersing the prepolymer in water, and finally conducting a chain extension in the water as disclosed in WO 98/41552, published Sep. 24, 1998, which is incorporated herein by reference. In this instance, the aqueous polyurethane dispersion will preferably have water as a continuous phase. U.S. Pat. No. 4,296,159 to Jenkines, et al., discloses preparing a tufted or woven article having a unitary backing prepared by applying a polyurethane forming composition to the underside of the tufted or woven article.

As a polyurethane dispersion, the polyurethane layer may be applied as a blown formulation. The blown formulation is generally prepared by mixing the A-side components with the B-side components in the presence of a gas, which is either mechanically introduced or chemically produced, to form bubbles that yield a cell-like structure in the cured polyurethane. Mechanical whipping of gas into a polyurethane formulation is also termed "frothing."

The industry standard sodium polyacrylate thickener improves the rheological properties of carpets prepared with aqueous dispersed polymeric compositions. Unfortunately, it also adversely affects the carpet's tuftbind and water barrier properties. Accordingly, it is desirable to use a thickener that imparts similar Theological properties without adversely affecting the finished carpet's tuftbind and water barrier properties.

SUMMARY OF THE INVENTION

According to the present invention, an aqueous dispersed polymeric composition for preparing a carpet backing is provided. In the preferred embodiment, the aqueous dispersed polymeric composition comprises an aqueous dispersed polymeric material and a hydrophobically-modified ethylene-oxide-based urethane block copolymer. In the more preferred embodiment, the aqueous dispersed polymeric material is an aqueous polyurethane dispersion composition. Moreover, a method for preparing a carpet backing using the aqueous dispersed polymeric composition is provided.

DESCRIPTION OF THE INVENTION

In the preferred embodiment, the aqueous dispersed polymeric composition for preparing a carpet backing comprises an aqueous dispersed polymeric material and a hydrophobically-modified ethylene-oxide-based urethane block copolymer as a thickener. The aqueous dispersed polymeric material is selected from the group consisting of an aqueous polyurethane dispersion composition, a styrene-butadiene latex, a butadiene-acrylonitrile latex, an ethylene-vinyl acetate latex, a styrene-butadiene-butyl acrylate latex, a polychloroprene latex, a polyethylene copolymer latex, an ethylene-styrene latex, a styrene-butadiene-vinylidene chloride latex, a styrene-alkyl acrylate latex, a vinyl latex, an acrylic latex, and mixtures thereof. In the more preferred embodiment, the aqueous dispersed polymeric material is an aqueous polyurethane dispersion composition.

In the present invention, polyurethane can refer to a polyurethane compound, a polyurea compound, or mixtures thereof. A polyurethane compound can be obtained by the reaction of a polyol with a polyisocyanate. A polyurea compound can be obtained by the reaction of an amine with a polyisocyanate. A polyurethane compound or polyurea compound can contain both urea and urethane functionality, depending on what compounds are included in the A and/or B-side formulations. For the purposes of the present application, no further distinction will be made herein between the polyurethane compounds and polyurea compounds. The term "polyurethane" will be used generically to describe a polyurethane compound, a polyurea compound, and mixtures thereof.

An aqueous polyurethane dispersion composition useful in the practice of the present invention includes water, and a polymeric compound selected from the group consisting of a polyurethane compound, a mixture of polyurethane-forming compounds, and mixtures thereof. Preferably, the aqueous polyurethane dispersion composition will have water as a continuous phase. Polyurethane-forming compounds as used in the present invention are compounds that are capable of forming polyurethane polymers. Polyurethane-forming compounds include, for example, polyurethane prepolymers. Prepolymers useful in the practice of the present invention are prepared by the reaction of active hydrogen compounds with any amount of isocyanate in excess material relative to active hydrogen material. The isocyanate functionality can be present in an amount of from about 0.2 wt % to about 40 wt %. A suitable prepolymer can have a molecular weight in the range of from about 100 to about 10,000. Prepolymers useful in the practice of the present invention should be substantially liquid under the conditions of dispersion.

Active hydrogen compounds can be described as compounds having functional groups that contain at least one hydrogen atom bonded directly to an electronegative atom such as nitrogen, oxygen or sulfur. Suitable active hydrogen compounds can be polyols of molecular weight of less than about 6000.

The aqueous polyurethane dispersion composition as described herein can include chain extenders, catalysts, fillers, filler wetting agents, surfactants, blowing agents, frothing agents, dispersants, foam stabilizers, other thickeners, fire retardants, defoamers, pigments, antistatic agents, reinforcing fibers, antioxidants, preservatives, acid scavengers, and other materials useful in polyurethane formulations. A chain extender is used herein to build the molecular weight of the polyurethane prepolymer by reaction of the chain extender with the isocyanate functionality in the polyurethane prepolymer, i.e., chain extend the polyurethane prepolymer.

A suitable chain extender is typically a low equivalent weight active hydrogen containing compound, having about 2 or more active hydrogen groups per molecule. The active hydrogen groups can be hydroxyl, mercaptyl, or amino groups. An amine chain extender can be blocked, encapsulated, or otherwise rendered less reactive. Other materials, particularly water, can function to extend chain length and so are chain extenders for purposes of the present invention. Polyamines are preferred chain extenders. It is particularly preferred that the chain extender be selected from the group consisting of amine terminated polyethers such as, for example, TEXRIM TR401™ from Huntsman Chemical Company, amino ethyl piperazine, 2-methyl piperazine, 1,5-diamino-3-methyl-pentane, isophorone diamine, ethylene diamine, diethylene triamine, triethylene tetramine, tetraethylene pentamine, ethanolamine, lysine in any of its stereoisomeric forms and salts thereof, hexane diamine, hydrazine and piperazine. In the practice of the present invention, the chain extender is often used as a solution of chain extender in water.

Small amounts of chain extender can be advantageously used. Generally, the chain extender is employed at a level sufficient to react with from about zero (0) to about 100 percent of the isocyanate functionality present in the prepolymer, based on one equivalent of isocyanate reacting with one equivalent of chain extender. It can be desirable, under certain conditions, to allow water to act as a chain extender and react with some or all of the isocyanate functionality present.

A catalyst can be used to promote the reaction between a chain extender and an isocyanate. Suitable catalysts include tertiary amines, organometallic compounds, similar compounds, and mixtures thereof. For example, suitable catalysts include di-n-butyl tin bis(mercaptoacetic acid isooctyl ester), dimethyltin dilaurate, dibutyltin dilaurate, dibutyltin sulfide, stannous octoate, lead octoate, ferric acetylacetonate, bismuth carboxylates, triethylenediamine, N-methyl morpholine, similar compounds, and mixtures thereof. An amount of catalyst is advantageously employed such that a relatively rapid cure to a tack-free state can be obtained. If an organometallic catalyst is employed, such a cure can be obtained by using from about 0.01 to about 0.5 parts per 100 parts of the polyurethane-forming composition, by weight. If a tertiary amine catalyst is employed, the catalyst preferably provides a suitable cure using from about 0.01 to about 3 parts of tertiary amine catalyst per 100 parts of the polyurethane-forming composition, by weight. Both an amine type catalyst and an organometallic catalyst can be employed in combination.

The aqueous polyurethane dispersion composition of the present invention can include conventional fillers such as milled glass, calcium carbonate, aluminum trihydrate, talc, bentonite, antimony trioxide, kaolin, fly ash, or other known fillers. A suitable filler loading in a polyurethane dispersion can be from about 100 to about 1000 parts of filler per 100 parts of the polyurethane compound. Preferably, the filler material can be loaded in an amount of at least about 200 pph, more preferably at least about 300 pph, most preferably at least about 400 pph.

The aqueous polyurethane dispersion composition of the present invention can include a filler wetting agent. A filler wetting agent generally renders the filler material compatible with a polyurethane-forming composition. Useful wetting agents include phosphate salts such as sodium hexametaphosphate. A filler wetting agent can be included in a polyurethane-forming composition of the present invention at a concentration of at least about 0.1 parts per 100 parts of filler, by weight.

Useful surfactants to make aqueous polyurethane dispersion composition include cationic and anionic surfactants. Examples of anionic surfactants include sulfonates, carboxylates, and phosphates. Examples of cationic surfactants include quaternary amines. Surfactants can be either external or internal. External surfactants are not chemically reacted into the polymer during dispersion preparation. Internal surfactants are chemically reacted into the polymer during dispersion preparation. A surfactant can be included in an amount ranging from about 0.01 to about 20 parts per 100 parts by weight of polyurethane component.

Examples of suitable blowing agents are gases such as air, carbon dioxide, nitrogen, argon, and helium; liquids such as water, low molecular weight hydrocarbons, and volatile halogenated alkanes; and azo-blowing agents such as azobis (formamide). Volatile halogenated alkanes include the various chlorofluoromethanes and chlorofluoroethanes. Preferable is the use of air as a blowing or frothing agent. A frothing agent can differ from a blowing agent in that frothing agents are typically introduced by mechanical whipping into the polyurethane formulation.

An aqueous polyurethane dispersion composition of the present invention can be stored for later application to the back of a carpet. Storage for this purpose requires that the dispersion be storage-stable. Alternatively, the polyurethane dispersion can be applied in a continuous manner to the back of a carpet primary backing. That is, the dispersion can be applied to the back of a carpet as the dispersion is obtained. Polyurethane dispersions applied to a carpet in a continuous manner are not required to be storage-stable, and can have higher solids content and/or larger mean particle size than typical storage-stable polyurethane dispersion formulations.

A suitable storage-stable aqueous polyurethane dispersion composition as defined herein is any polyurethane dispersion composition having a mean particle size of less than about 5 micrometers; a more preferable mean particle size is less than about 1 micrometer. A polyurethane dispersion that is not storage-stable can have a mean particle size of greater than 5 micrometers. For example, a suitable dispersion can be prepared by mixing a polyurethane prepolymer with water and dispersing the prepolymer in the water using a commercial blender. Alternatively, a suitable dispersion can be prepared by feeding a prepolymer into a static mixing device along with water, and dispersing the water and prepolymer in the static mixer. Continuous methods for preparing aqueous dispersions of polyurethane are known and can be used in the practice of the present invention. For example, U.S. Pat. Nos. 3,437,624; 4,092,286; 4,237,264; 4,742,095; 4,857,565; 4,879,322; 5,037,864; and 5,221,710 describe continuous processes useful for obtaining aqueous polyurethane dispersions. In addition, a continuous process for preparing an aqueous polyurethane dispersion having a high internal phase ratio is described in U.S. Pat. No. 5,539,021, incorporated herein by reference.

In preparing a frothed polyurethane backing, it is often preferable to premix all of the components except the polyisocyanate (and the blowing agent when a gas is used) to form a "B" component. The polyisocyanate and the B component are admixed and then the blowing agent gas is blended in using, for example, an OAKES FROTHER* (*OAKES FROTHER is a trade designation of the E.T. Oakes Corporation). The composition is preferably applied to a textile or other substrate prior to any significant level of curing using equipment such as a doctor knife, air knife, or extruder to apply and gauge the layer. In the alternative, the composition may be applied by (1) forming it into a layer on a moving belt or other suitable apparatus, (2) dehydrating or partially curing, and (3) finally, marrying it to the carpet primary backing. It may be married to the carpet primary backing with equipment such as a double belt laminator (also known as double band) or a moving belt with an applied foam cushion. The polyurethane is then allowed to cure by applying heat by means of an infrared oven, open flame forced draft convection impingement oven, heated plates or the like.

In preparing polyurethane-backed carpets according to the present invention, an aqueous polyurethane dispersion is applied as a layer of preferably uniform thickness onto one surface of a carpet primary backing. Aqueous polyurethane dispersions of the present invention can be applied as a precoat, a laminate layer, or a foam layer. Polyurethane precoats, laminate layers, and foam layers can be prepared by methods known in the art. Precoats, laminate layers and foam layers prepared from latexes are described in P. L. Fitzgerald, "Integral Latex Foam Carpet Cushioning", J. Coat. Fab. 1977, Vol. 7 (pp.107–120), and in R. P. Brentin, "Latex Coating Systems for Carpet Backing", J. Coat. Fab. 1982, Vol. 12 (pp. 82–91).

The polyurethane-forming composition can be applied to one surface of a carpet primary backing before it cures to a tack-free state. Alternatively, a polyurethane dispersion containing no unreacted isocyanate functionality can be applied, thereby removing the need to cure the polymer. Typically the polyurethane-forming composition is applied to the surface attached to a primary backing. The amount of polyurethane-forming composition used can vary widely, from about 5 to about 500 ounces per square yard (0.17 to 16.95 kg/sq. meter), depending on the characteristics of the textile.

A styrene-butadiene latex useful for practicing the present invention is disclosed in P. L. Fitzgerald, "Integral Latex Foam Carpet Cushioning", J. Coat. Fab. 1977, Vol. 7 (pp.107–120) and in R. P. Brentin, "Latex Coating Systems for Carpet Backing", J. Coat. Fab. 1982, Vol. 12 (pp. 82–91), both incorporated herein by reference. A styrene-butadiene-vinylidene chloride latex useful for practicing the present invention is disclosed in U.S. Pat. No. 5,741,393, incorporated herein by reference.

U.S. Pat. No. 5,770,660, incorporated herein by reference, discloses a method for preparing a butadiene-acrylonitrile latex that is useful for practicing the present invention. U.S. Pat. Nos. 3,644,262 and 4,164,489, incorporated herein by reference, disclose methods for preparing ethylene-vinyl-acetate latexes that are useful for practicing the present invention. U.S. Pat. No. 5,591,806, incorporated herein by reference, discloses a method for preparing an ethylene acrylic acid aqueous dispersion that is useful for practicing the present invention.

U.S. Pat. Nos. 3,890,261 and 5,661,205, incorporated herein by reference, disclose methods for preparing poly-chloroprene latexes useful for practicing the present invention. U.S. Pat. No. 5,380,785, incorporated herein by reference, discloses a method for preparing a butyl acrylate-acrylonitrile-styrene latex that is useful for practicing the present invention. U.S. Pat. Nos. 4,689,256 and 5,300,551, incorporated herein by reference, disclose methods for preparing vinyl chloride polymer latexes that are useful in practicing the present invention.

U.S. Pat. No. 5,591,806, incorporated herein by reference, discloses a method for preparing a ethylene acrylic acid copolymer latex that is useful in practicing the present invention. U.S. Pat. No. 4,714,728, incorporated herein by reference, discloses a method for preparing an aqueous dispersion of acidic ethylene interpolymers that are useful in practicing the present invention.

U.S. Pat. No. 4,228,058, incorporated herein by reference, discloses a method for preparing a mixture of vinylidene chloride latex and a styrene-butadiene latex useful in practicing the present invention. Other methods of preparing useful aqueous dispersed polymeric compositions would be readily apparent to a person of ordinary skill in the art in view of this disclosure. Those methods and aqueous dispersed polymeric compositions are within the scope of the invention with regard to preparing useful aqueous dispersed polymeric compositions.

The hydrophobically-modified ethylene-oxide-based urethane block copolymer of the present invention is a thickener that imparts excellent rheological properties to the aqueous polyurethane dispersion without adversely affecting the finished carpet's tuftbind and water barrier properties. Examples of the thickeners are available commercially from Rohm and Haas Company under the ACRYSOL™ trademark. Specific examples of ACRYSOL™ thickeners are shown in TABLE 1.

TABLE 1

| Product | Percent Solids | Solvent | Brookfield Viscosity, cP |
|---|---|---|---|
| RM-825 | 25 | 25:75 (DGBE:Water) | 1000–2500 |
| RM-8W | 17.5 | Water | 3000–3500 |
| RM-1020 | 20 | 12:88 (DGBE:Water) | 1000–2500 |
| RM-2020 NPR | 20 | Water | 2500–3800 |
| SCT-275 | 17.5 | 25:75 (DGBE:Water) | 2000–3000 |
| RM-12W | 19 | Water | 3000–4000 |

"DGBE" = diethylene glycol monobutyl ether

The thickener can be added to the carpet backing formulation mixture in an amount of from 0.01 parts to about 1.5 parts, based on parts of thickener solids per hundred parts of polymer solids. Preferably the thickener is added in an amount of from about 0.05 parts to about 1.0 parts, more preferably form about 0.1 parts to about 0.75, and most preferably from about 0.2 parts to about 0.5 parts.

The thickeners can be added alone or mixed with other thickeners to give the desired Newtonian or non-Newtonian rheological response. For Newtonian flow characteristics, RM 825, RM 8W, RM 1020, and RM 2020 NPR are preferred. These thickeners are used alone or, preferably, diluted with water to about 10 to about 15% solids to prevent compound shocking as the thickener is added. For non-Newtonian flow characteristics, SCT 275 or RM 12W is preferred. These thickeners are also diluted with water to reduce compound. The most preferred thickener is a blend of RM 8W with RM 12W in a 1:2 ratio. The blended thickener is diluted with water to a mixture having about 13.2% solids. Notably, the blended thickener provides a modified non-Newtonian response at very low levels of thickener solids (about 0.5 part per hundred polymer).

The embodiments described herein are given to illustrate the scope and spirit of the present invention. The embodiments herein will make apparent to those skilled in the art other embodiments that may also be used. These other embodiments are within the scope of the present invention. Thus, the scope of the invention should be determined by the appended claims and their legal equivalents, rather than by the embodiments given herein.

EXAMPLES

The following examples merely exemplify various embodiments of the invention. It is understood that the following examples are provided to further illustrate the invention. They do not in anyway limit the scope of the present invention.

Table of Compounds

The following thickeners were used in the preparation of the exemplified polyurethane carpet backings. The table provides the thickener's generic name, its trade designation, and its vendor.

| Generic Name | Trade Designation | Vendor |
|---|---|---|
| Acrylic emulsion copolymer (alkali-soluble or swellable emulsion), 28% solids | ACRYSOL ASE-60 | Rohm and Haas Company |
| Acrylic emulsion copolymer (alkali-soluble or swellable emulsion), 40% solids | ACRYSOL ASE-75 | Rohm and Haas Company |
| Hydrophobically modified ethylene-oxide-based urethane block copolymer, 17.5% solids | ACRYSOL RM-8W | Rohm and Haas Company |
| Hydrophobically modified ethylene-oxide-based urethane block copolymer, 19% solids | ACRYSOL RM-12W | Rohm and Haas Company |
| Hydrophobically modified ethylene-oxide-based urethane block copolymer, 25% solids | ACRYSOL RM-825 | Rohm and Haas Company |
| Hydrophobically modified ethylene-oxide-based urethane block copolymer, 20% solids | ACRYSOL RM-2020NPR | Rohm and Haas Company |
| Hydrophobically modified ethylene-oxide-based urethane block copolymer, 17.5% solids | ACRYSOL SCT-275 | Rohm and Haas Company |
| Hydrophobically modified alkali-soluble emulsion, 30% solids | ACRYSOL TT-935 | Rohm and Haas Company |
| Nonionic, non-urethane associative thickener | NOPCO DSX 2000 | Henkel Corp. |
| Sodium polyacrylate thickener | PARAGUM 241 | Para-Chem Southern, Inc. |
| Urethane functional, alkali-swellable associative thickener | UCAR POLYPHOBE 101 | Union Carbide Corp. |
| Urethane functional, alkali-swellable associative thickener | UCAR POLYPHOBE 102 | Union Carbide Corp. |
| Urethane functional, alkali-swellable associative thickener | UCAR POLYPHOBE 106HE | Union Carbide Corp. |
| Urethane functional, alkali-swellable associative thickener | UCAR POLYPHOBE 108 | Union Carbide Corp. |
| Urethane functional, alkali-swellable associative thickener | UCAR POLYPHOBE 9829 | Union Carbide Corp. |
| Urethane functional, alkali-swellable associative thickener | UCAR POLYPHOBE 9831 | Union Carbide Corp. |
| Nonionic associative thickener | RHEOLATE 310 | Rheox Inc. |
| Polyurethane associative thickener | TAFIGEL PUR 46 | King Industries |

Example Nos. 1–8

For Example Nos. 1–8, a standard polyurethane carpet backing formulation was used. Example No. 1 also contained 2.5 parts zinc stearate as a hydrophobe modifier agent.

The carpet backing was analyzed to determine its water absorption after 24 hours of soaking as a weight percent. The samples were prepared by drying overnight at 80° C. and then pressing 100° C. under 10,000 lbs. (4545 kg.) piston pressure in a Pasadena Hydraulic Inc. press to make a thin film. The results are reported in Table 2.

The data indicates that the samples prepared by using the industry standard, PARAGUM 241, a sodium polyacrylate thickener had the greatest water absorption when compared to samples prepared with nonionic associative thickeners and urethane associative thickeners.

TABLE 2

| Ex. No. | Thickener | Amount of Thickener (Parts) | Water Absorption, % w/w |
|---|---|---|---|
| 1 | PARAGUM 241 | 1.22 | 21.01 |
| 2 | PARAGUM 241 | 2.44 | 37.35 |
| 3 | RHEOLATE 310 | 1.22 | 5.66 |
| 4 | NOPCO DSX 2000 | 1.22 | 4.9 |
| 5 | TAFIGEL PUR 46 | 1.22 | 5.02 |
| 6 | UCAR POLYPHOBE 108 | 1.22 | 7.55 |
| 7 | None added | | 8.52 |
| 8 | None added | | 4.46 |
| 9 | UCAR POLYPHOBE 101 | 1.24 | 7.49 |
| 10 | UCAR POLYPHOBE 102 | 1.24 | 9.18 |
| 11 | UCAR POLYPHOBE 106 HE | 1.24 | 8.66 |
| 12 | UCAR POLYPHOBE 9829 | 1.24 | 9.4 |
| 13 | UCAR POLYPHOBE 9831 | 1.24 | 15.58 |

Example Nos. 14–20

For Example Nos. 14–20, a standard polyurethane carpet backing formulation was used. The carpet backing was analyzed to determine its water absorption after 24 hours of soaking as a weight percent.

The samples were prepared by drying overnight at 80° C., pressing 100° C. under 20,000 lbs. (9090 kg.) piston pressure in a Pasadena Hydraulic Inc. press to make a thin film, and then drying for an additional 5 hours. The results are reported in Table 3.

Samples prepared with acrylic copolymer thickeners were compared with hydrophobically modified thickeners. The samples had a thickness of about 1.50 mm. The data indicates that the samples prepared with hydrophobically modified ethylene-oxide-based urethane block copolymer thickeners absorbed the least amount of water.

TABLE 3

| Ex. No. | Thickener | Amount of Thickener (Parts) | Water Absorption, % w/w |
|---|---|---|---|
| 14 | ACRYSOL ASE-60 | 1.22 | 9.31 |
| 15 | ACRYSOL ASE-75 | 1.22 | 13.36 |
| 16 | ACRYSOL RM-825 | 1.22 | 3.49 |
| 17 | ACRYSOL RM-2020NPR | 1.22 | 3.44 |
| 18 | ACRYSOL RM-2020NPR | 2.44 | 3.97 |
| 19 | ACRYSOL SCT-275 | 1.22 | 3.24 |
| 20 | ACRYSOL TT-935 | 1.22 | 13.94 |

Example Nos. 21–26

For Example Nos. 21–26, production quantities of a standard polyurethane carpet backing formulation were prepared. Non-frothed and frothed aqueous polyurethane dispersions were applied as carpet backings.

The method of application dictates the targeted viscosity. The target viscosity is measured on the formulated compound at 20 RPM (Brookfield RPM shear). To achieve the target viscosity, a particular amount of thickener is required. The amount required for each thickener is defined by its efficiency.

For the non-frothed examples, the desired viscosity was between about 24,000 and about 35,000 centipoise measured with a No. 6 spindle. For the frothed examples, the desired viscosity was between about 12,000 and about 24,000 centipoise measured with a No. 6 spindle.

The carpet backing was analyzed according to industry standards. The results are reported in Table 4.

For non-frothed systems, the data indicates that a carpet backing containing the industry standard, PARAGUM 241, a sodium polyacrylate thickener demonstrated the poorest wet tuftbind and tuftbind retention when compared to carpet backing containing hydrophobically modified ethylene-oxide-based urethane block copolymer thickeners. Moreover, it showed a watermark after 24 hours.

For frothed systems, a carpet backing containing a mixture of ACRYSOL RM 8W and ACRYSOL RM 12W outperformed carpet backings containing PARAGUM 241 or ACRYSOL RM-825. It provided the best wet tuftbind and tuftbind retention properties. It also passed the British Spill test without showing a watermark after 24 hours.

The data also demonstrates that to achieve the desired viscosity, the industry standard PARAGUM 241 was less efficient, requiring the use of more thickener.

TABLE 4

| Ex. No. | Thickener | Amount of Thickener (Parts per hundred resin) | Viscosity, Centipose @ 20 RPM | Coat Wt. (oz/yd$^2$) (g/cm$^2$) | Tuftbind, lb. (kg) | 20 Min. Wet Tuftbind, lb (kg) | % R. | British Spill | 24-hour Watermark |
|---|---|---|---|---|---|---|---|---|---|
| 21 | P 241 | 2.3 | 25,600 | 41 (0.139) | 17.4 (7.9) | 5.5 (2.5) | 31.7 | Pass | yes |
| 22 | RM 825 | 0.875 | 28,900 | 44 (0.149) | 19.5 (8.9) | 11.5 (5.2) | 59.2 | Pass | no |
| 23 | 1:2 mixture 8W/12W | 0.49 | 26,600 | 45 (0.152) | 20.4 (9.3) | 13.4 (6.1) | 65.5 | Pass | no |
| 24 | P 241 (frothed) | 0.97 | 13,000 | 32 (0.108) | 18.7 (8.5) | 6.1 (2.8) | 32.7 | Pass | yes |

TABLE 4-continued

| Ex. No. | Thickener | Amount of Thickener (Parts per hundred resin) | Viscosity, Centipose @ 20 RPM | Coat Wt. (oz/yd$^2$) (g/cm$^2$) | Tuftbind, lb. (kg) | 20 Min. Wet Tuftbind, lb (kg) | % R. | British Spill | 24-hour Watermark |
|---|---|---|---|---|---|---|---|---|---|
| 25 | RM 825 (frothed) | 0.16 | 15,700 | 28 (0.095) | 13.3 (6.0) | 5.1 (2.3) | 38.2 | Fail | yes |
| 26 | 1:2 mixture 8W/12W (frothed) | 0.38 | 18,900 | 33 (0.112) | 15.2 (6.9) | 8.5 (3.9) | 56.1 | Pass | no |

"P 241" = PARAGUM 241;
"RM 825" = ACRYSOL RM 825;
"RM 8W" = ACRYSOL 8W;
"RM 12W" = ACRYSOL RM 12W;
"% R." = percent of tuftbind retained

What is claimed is:

1. A carpet-backing composition, the composition being an aqueous dispersed polymeric composition comprising:
   a. an aqueous dispersed polymeric material and
   b. a hydrophobically modified ethylene-oxide-based urethane block copolymer.

2. The aqueous dispersed polymeric composition of claim 1 wherein the aqueous dispersed polymeric material is selected from the group consisting of an aqueous polyurethane dispersion composition, a styrene-butadiene latex, a butadiene-acrylonitrile latex, an ethylene-vinyl acetate latex, a styrene-butadiene-butyl acrylate latex, a chloroprene latex, a polyethylene copolymer latex, an ethylene-styrene latex, a styrene-butadiene-vinylidene chloride latex, a styrene-alkyl acrylate latex, a vinyl latex, an acrylic latex, and mixtures thereof.

3. The aqueous dispersed polymeric composition of claim 1 wherein the hydrophobically modified ethylene-oxide-based urethane block copolymer is present in a concentration between about 0.01 parts and about 1.5 parts, based on parts of solids per hundred parts of polymer solids.

4. The aqueous dispersed polymeric composition of claim 2 wherein the aqueous dispersed polymeric material is an aqueous polyurethane dispersion composition.

5. A method for preparing a polymer-backed carpet comprising:
   a. forming an aqueous dispersed polymeric composition by mixing
      i. an aqueous dispersed polymeric material and
      ii. a hydrophobically modified ethylene-oxide-based urethane block copolymer; and
   b. applying the aqueous dispersed polymeric composition to a carpet.

6. The method for preparing a polymer-backed carpet of claim 5 wherein the aqueous dispersed polymeric material is selected from the group consisting of an aqueous polyurethane dispersion composition, a styrene-butadiene latex, a butadiene-acrylonitrile latex, an ethylene-vinyl acetate latex, a styrene-butadiene-butyl acrylate latex, a chloroprene latex, a polyethylene copolymer latex, an ethylene-styrene latex, a styrene-butadiene-vinylidene chloride latex, a styrene-alkyl acrylate latex, a vinyl latex, an acrylic latex, and mixtures thereof.

7. The method for preparing a polymer-backed carpet of claim 6 wherein the aqueous dispersed polymeric material is an aqueous polyurethane dispersion composition.

8. A polymer-backed carpet prepared in accordance with claim 7.

9. The polymer-backed carpet of claim 8, wherein the aqueous dispersed polymeric composition is applied as a carpet layer selected from the group consisting of a precoat, a laminate layer, and a foam layer.

10. The polymer-backed carpet of claim 5, wherein the carpet has a moisture barrier that is improved relative to a backed carpet prepared from composition with a sodium-polyacrylate thickener instead of a hydrophobically modified ethylene-oxide-based urethane block copolymer.

11. The polymer-backed carpet of claim 9, wherein the carpet has a moisture barrier that is improved relative to a backed carpet prepared from a composition with a sodium-polyacrylate thickener instead of a hydrophobically modified ethylene-oxide-based urethane block copolymer.

12. A method for improving moisture-barrier properties of a polymer-backed carpet, the method comprising:
   a. formulating a carpet-backing composition, the composition being an aqueous dispersed polymer composition comprising:
      i. an aqueous dispersed polymeric material; and
      ii. a hydrophobically modified ethylene-oxide-based urethane block copolymer;
   b. applying the carpet-backing composition to a carpet; and
   c. curing the carpet-backing composition on the carpet to prepare a polymer-backed carpet,
wherein moisture-barrier properties of the polymer-backed carpet are improved when compared to moisture-barrier properties of a polymer-backed carpet being prepared from a composition with a sodium-polyacrylate thickener instead of a hydrophobically modified ethylene-oxide-based urethane block copolymer.

13. The method for improving moisture-barrier properties of a polymer-backed carpet according to claim 12, wherein the carpet-backing composition is formulated from an aqueous dispersed polymeric material that is an aqueous polyurethane dispersion composition.

14. The method for improving moisture-barrier properties of a polymer-backed carpet according to claim 12, wherein the carpet-backing composition is formulated from a hydrophobically modified ethylene-oxide-based urethane block copolymer in an amount of 0.01 parts to 1.5 parts based on parts of thickener solid per hundred parts of polymer solids.

* * * * *